US012600017B2

(12) United States Patent
Leffler

(10) Patent No.: US 12,600,017 B2
(45) Date of Patent: Apr. 14, 2026

(54) SPOUT SEPARATING TOOL

(71) Applicant: Zebulun Robert Leffler, Varysburg, NY (US)

(72) Inventor: Zebulun Robert Leffler, Varysburg, NY (US)

( * ) Notice: Subject to any disclaimer, the term of this patent is extended or adjusted under 35 U.S.C. 154(b) by 375 days.

(21) Appl. No.: 18/237,943

(22) Filed: Aug. 25, 2023

(65) Prior Publication Data

US 2024/0057534 A1 Feb. 22, 2024

Related U.S. Application Data

(63) Continuation-in-part of application No. 17/891,122, filed on Aug. 18, 2022.

(51) Int. Cl.
*B25B 28/00* (2006.01)
*B25B 7/00* (2006.01)

(52) U.S. Cl.
CPC ................ *B25B 28/00* (2013.01); *B25B 7/00* (2013.01)

(58) Field of Classification Search
CPC ............ B25B 7/00; B25B 28/00; A01G 23/14
USPC ................................. 81/300, 3.56, 385, 384
See application file for complete search history.

(56) References Cited

U.S. PATENT DOCUMENTS

| | | | | | |
|---|---|---|---|---|---|
| 254,601 | A * | 3/1882 | Brooks | B25B 7/22 | |
| | | | | 7/137 | |
| 518,283 | A * | 4/1894 | Snyder | B25B 25/005 | |
| | | | | 7/137 | |
| 1,431,708 | A * | 10/1922 | Tisdale | H01T 13/24 | |
| | | | | 81/484 | |
| 2,484,043 | A * | 10/1949 | Malen | B67B 7/162 | |
| | | | | 29/246 | |
| 3,895,214 | A * | 7/1975 | Winter | H05K 13/0007 | |
| | | | | 228/19 | |
| 7,146,879 | B2 * | 12/2006 | Crudgington, Jr. | B67B 7/066 | |
| | | | | 81/3.36 | |
| 9,789,678 | B1 * | 10/2017 | Christensen | B32B 43/006 | |
| 11,203,081 | B2 * | 12/2021 | Izumi | B23K 11/3072 | |

* cited by examiner

*Primary Examiner* — Hadi Shakeri
(74) *Attorney, Agent, or Firm* — Jong Patent Firm; Cheng Ning Jong; Tracy P. Jong

(57) ABSTRACT

A device including a first plate including a leading edge and a second plate including a leading edge, wherein the first plate is configured to cooperate with the second plate to separate an attached unit formed of two parts, the first plate and the second plate are configured to be opposingly disposed about the attached unit with their leading edges facing one another and at least one of the first plate and the second plate is configured to move towards the other one of the first plate and second plate such that a distance between a first contact point between the first plate and the attached unit and a second contact point between the second plate and the attached unit increases to cause the attached unit to be separated into the two parts.

19 Claims, 16 Drawing Sheets

SPOUT SEPARATING TOOL

PRIORITY CLAIM AND RELATED APPLICATIONS

This continuation-in-part application claims the benefit of priority from non-provisional application U.S. Ser. No. 17/891,122 filed on Aug. 18, 2022. Said application is incorporated by reference in its entirety.

BACKGROUND OF THE INVENTION

1. The Field of the Invention

The present invention relates to a spout separating tool. More specifically, the present invention is directed to a spout separating tool that is also useful for removing a spout from a tree and inserting a spout in a predrilled hole.

2. Background Art

The tapping of a maple tree for its sap involves first creating an elongated hole so that a spout can be installed to facilitate collection of the sap. Severe reductions in sap production can occur if elongated holes are created without due care as air leaks can occur around spouts installed in these elongated holes. Therefore, it is imperative that elongated holes with consistent diameters be created such that spouts can be fit tightly to eliminate air leaks which can lead to severe reduction in sap production.

There exists a need for a maple tree tapping tool that allows elongated holes with consistent diameters to be created and a maple tree tapping tool that does not get clogged up easily during use and can continue to service all trees of a maple tree farm without fail or without requiring cleaning, undue maintenance and/or repair.

SUMMARY OF THE INVENTION

In accordance with the present invention, there is provided a device for separating two parts, a first of the two parts is configured to be inserted in a second of the two parts in a first direction to form an attached unit, the device including:

(a) a first plate including a leading edge; and (b) a second plate including a leading edge, wherein the first plate is configured to cooperate with the second plate to separate the attached unit, the first plate and the second plate are configured to be opposingly disposed about the attached unit with their leading edges facing one another and at least one of the first plate and the second plate is configured to move towards the other one of the first plate and second plate such that a distance in the first direction between a first contact point between the first plate and the attached unit and a second contact point between the second plate and the attached unit increases to cause the attached unit to be separated into the two parts.

In one embodiment, a first part of the two parts is a stubby spout and a second part of the two parts is a check valve adapter. In one embodiment, the first plate includes a first thickness at the leading edge of the first plate and a second thickness at a portion of the first plate away from the leading edge of the first plate and the second thickness is greater than the first thickness. In one embodiment, the first plate is configured to be pivotably connected to the second plate. In one embodiment, at least one of the first plate and the second plate includes a cutout disposed at the respective leading edge, the cutout configured to surround a portion the attached unit. In one embodiment, the device further includes a striking head. In one embodiment, the striking head is configured to be secured to one of the first plate and the second plate using a pin configured to pivotably connect the first plate and the second plate. In one embodiment, the first plate is configured to be pivotably connected to the second plate to facilitate the disposition of the first plate and the second plate in an overlapped configuration to form a handle for the striking head. In one embodiment, the device further includes a stop disposed on one of the first plate and the second plate to ensure that the handle has been properly formed when the stop comes in contact with the other plate of the first plate and the second plate. In one embodiment, the device further includes a beveled claw extending from one of the first plate and the second plate. In one embodiment, the device further includes a hanging hole disposed on one of the first plate and the second plate.

In accordance with the present invention, there is further provided a device for separating two parts, a first of the two parts is configured to be inserted in a second of the two parts in a first direction to form an attached unit, the device including:

(a) a first jaw including a leading edge and a cross-sectional profile which tapers towards the leading edge of the first jaw;

(b) a second jaw including a leading edge and a cross-sectional profile which tapers towards the leading edge of the second jaw, the second jaw coupled to and movable relative to the first jaw between a closed position and an open position, the second jaw is configured to define a space with respect to the first jaw to receive an attachment interface of the attached unit in a position between the closed position and the open position, wherein a relative movement of the second jaw towards the first jaw causes the attached unit to be separated into the two parts when the first jaw and second jaw are disposed about the attachment interface.

In one embodiment, the device further includes a first shank extending from the first jaw and a second shank extending from the second jaw, wherein the second shank is configured to be stacked with respect to the first shank when the first jaw and the second jaw are disposed in the closed position. In one embodiment, the device further includes a first shank extending from the first jaw and a second shank extending from the second jaw, wherein the first shank is configured to be pivotably connected to the second shank. In one embodiment, at least one of the first jaw and the second jaw includes a cutout disposed at the respective leading edge, the cutout is configured to surround the attachment interface. In one embodiment, the device further includes a striking head, a first shank extending from the first jaw and a second shank extending from the second jaw, wherein the striking head is configured to be secured to one of the first shank and the second shank using a pin configured to pivotably connect the first shank and the second shank. In one embodiment, the device further includes a stop, a first shank extending from the first jaw and a second shank extending from the second jaw, wherein the stop is disposed on one of the first shank and the second shank to ensure that a handle has been properly formed when the stop comes in contact with the other one of the first shank and the second shank. In one embodiment, the device further includes a beveled claw extending from one of the first jaw and the second jaw.

In one embodiment, the device further includes a hanging hole, a first shank extending from the first jaw and a second shank extending from the second jaw, wherein the hanging hole is disposed on one of the first shank and the second shank. In one embodiment, a first part of the two parts is a stubby spout and a second part of the two parts is a check valve adapter.

An object of the present invention is to provide a device to easily separate the two parts of a spout or spile so one or both of the parts can be replaced.

Another object of the present invention is to provide a device to easily separate the two parts of a spout or spile so one or both of the parts can be replaced without severing and shortening the attached hose.

Another object of the present invention is to provide a device to easily separate the two parts of a spout or spile one or both of the parts can be replaced to prevent bacterial contamination of the sap and to preserve the health of maple trees by minimizing the need for new holes to be tapped in the trees when tap holes are plugged with debris.

Another object of the present invention is to provide a device to easily separate the two parts of a spout or spile so they can be completely removed from the tree for cleaning or replacement.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—maple tree tapping tool or device
4—drill
6—drill bit
8—front plate
10—aperture
12—locator pin
14—point of locator pin
16—body or adjustable ring
18—slide, e.g., spring-loaded slide
20—rod
22—linear motion bearing
24—block
26—latch
28—slot
30—lever or trigger
32—fastener
34—paint marker
36—paint marking tip
38—spout separating or removal tool or device
40—first shank
41—second shank
42—first jaw
43—second jaw
44—pivot point
45—pin
46—striking head
48—claw
49—stubby spout
50—check valve adapter

51—hose
52—central axis of block
54—central axis of drill bit
56—central axis of slide
58—opening
60—tree surface
62—drilled hole
64—direction in which drill is pressed against surface
66—first position of front plate relative to body
68—second position of front plate relative to body
70—third position of front plate relative to body
72—portion of front plate where latch can be engaged
74—opening
76—contour of tree trunk
78—first cutout
80—second cutout
82—stop
84—cutout
86—leading edge of first jaw
88—leading edge of second jaw
90—hose coupler
92—check valve adapter tap
94—stubby spout taper
96—attachment interface
98—hanging hole
100—tree bark
102—sapwood

Particular Advantages of the Invention

The present device allows an attached unit formed of a stubby spout and a check valve adapter of a two-part spout to be separated to avoid requiring a hose connected to the spout, to be cut such that the two-part spout can be removed and discarded in its entirety. With the ability to remove a stubby spout from the check valve adapter it is attached to, the stubby spout is left connected to the hose, leaving the stubby spout reusable and the hose intact. Further, when the hose is left intact, there is no need to replace the hose as a cut hose would eventually become too short to connect to its collection system after several cuttings over several seasons.

The shanks of the present device are used to apply a force at a set of closing jaws to separate the two-part spout. In its stacked form, the shanks serve as a handle for a striking head, thereby providing the same shanks additional utility as a striking tool. The present device further includes a claw configured to remove a spout from a maple tree. These combined features of the present device negate the need for multiple segregated tools to be transported to site.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
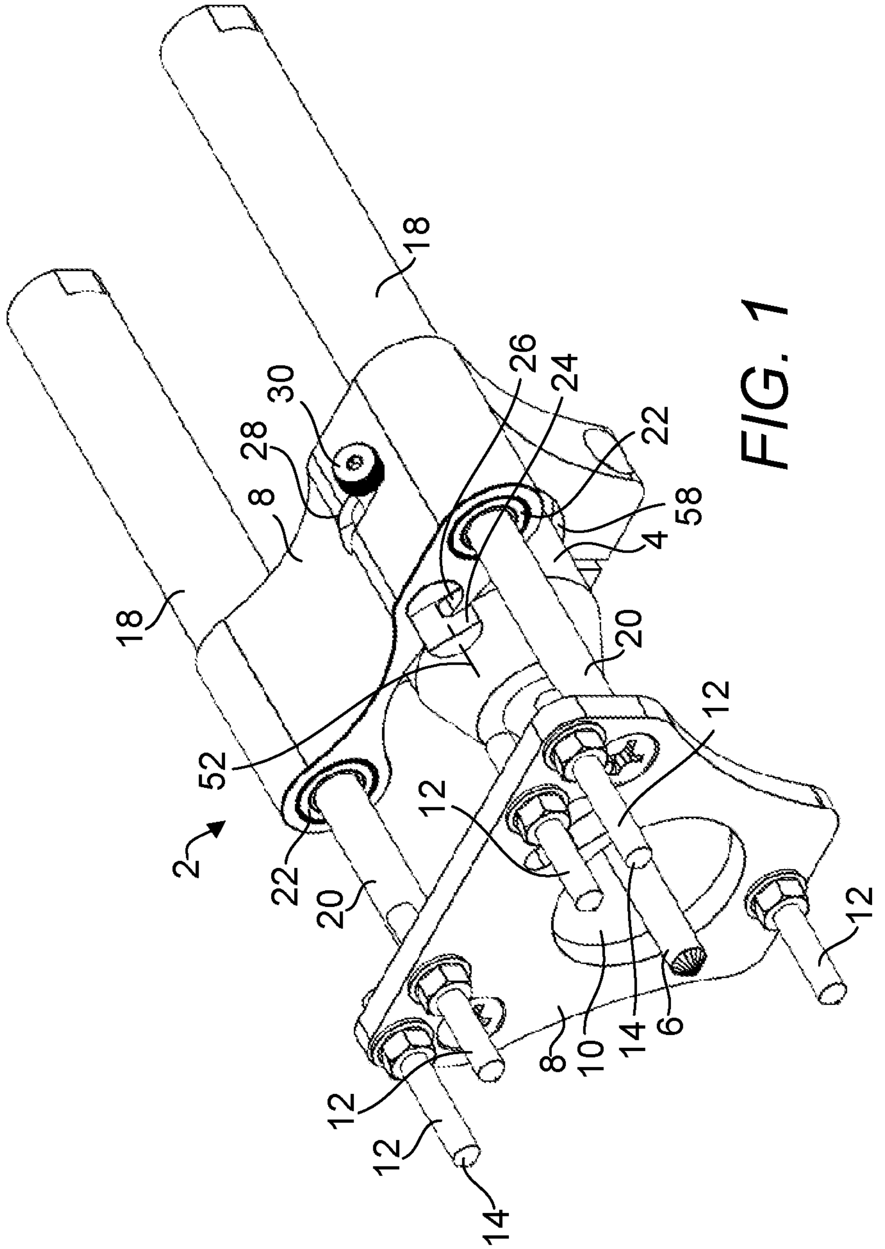
FIG. 1 is a top front perspective view of a device configured to be adaptable to a drill.
Figure 2:
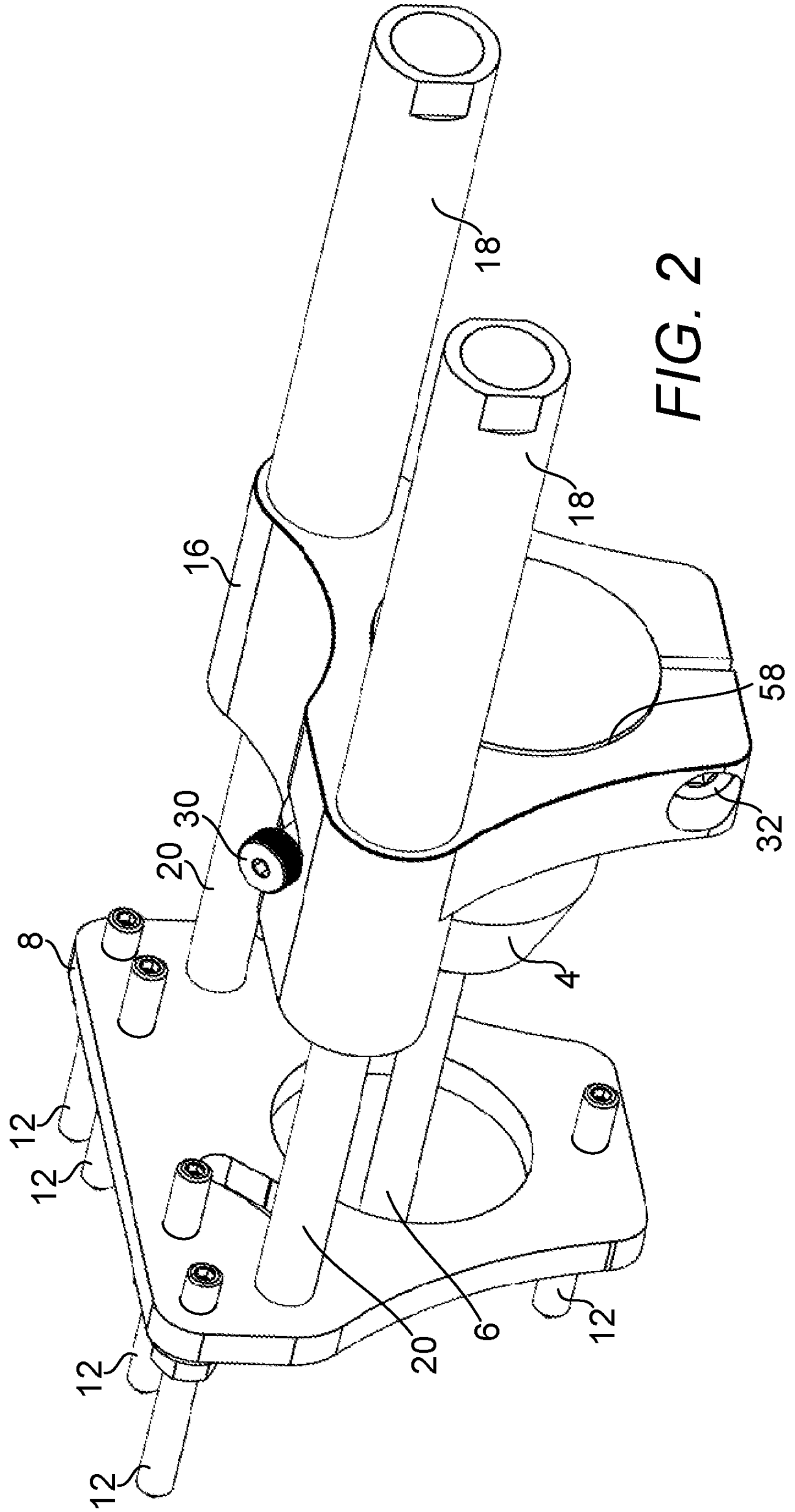
FIG. 2 is a top rear perspective view of a device configured to be adaptable to a drill.
Figure 3:
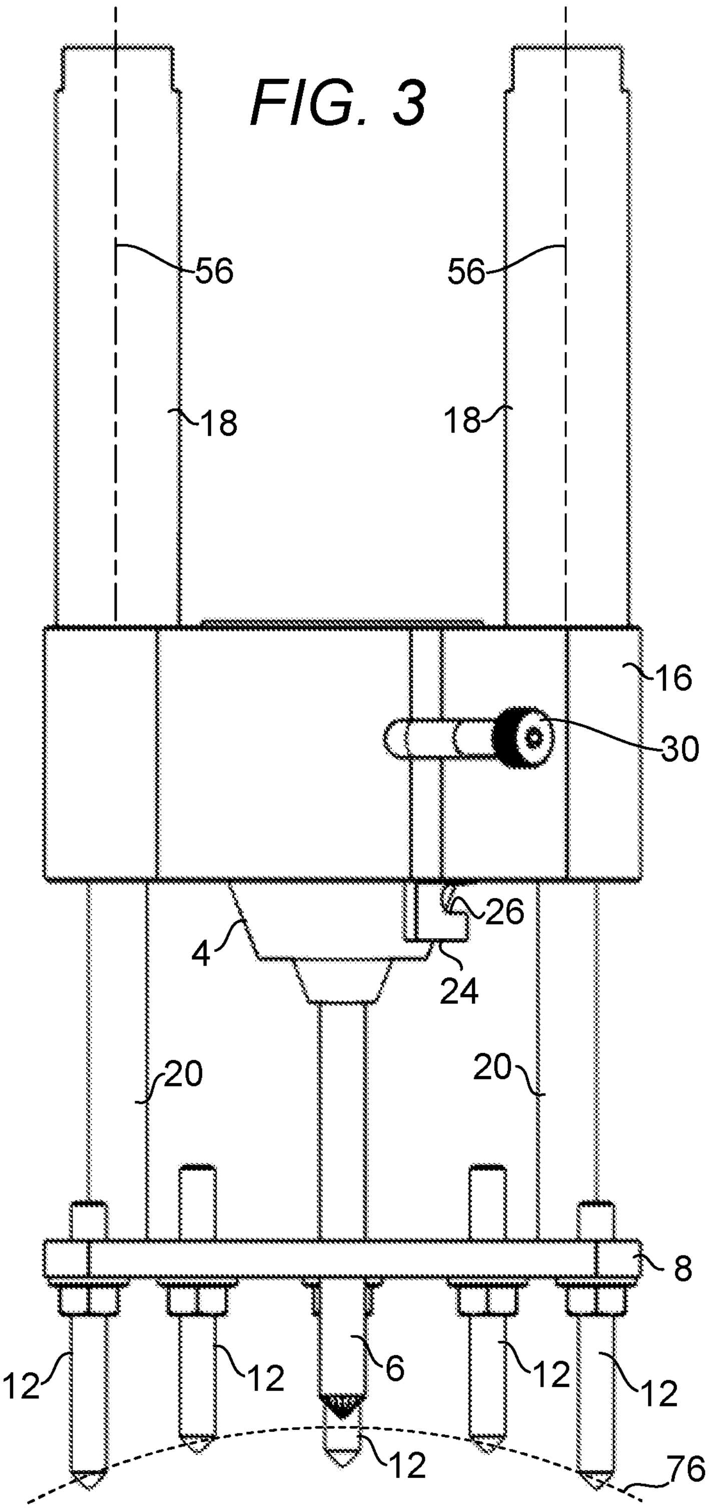
FIG. 3 is a top view of a device configured to be adaptable to a drill.
Figure 4:
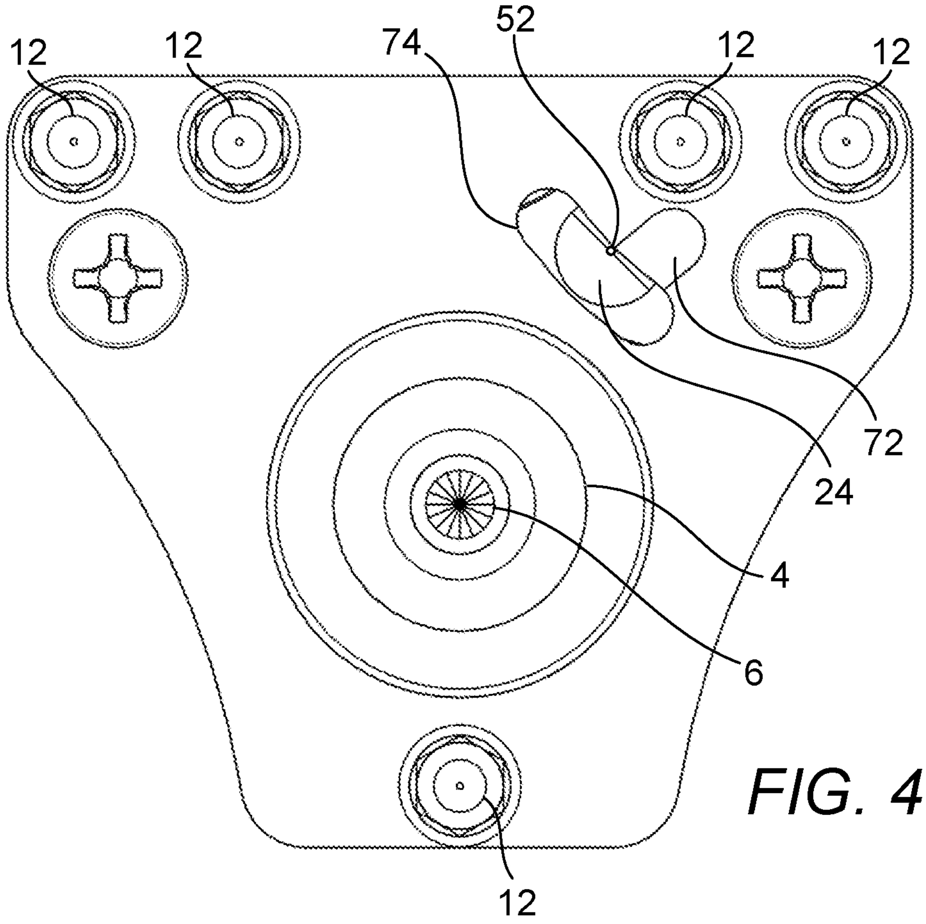
FIG. 4 is a front view of a device configured to be adaptable to a drill.
Figure 5:
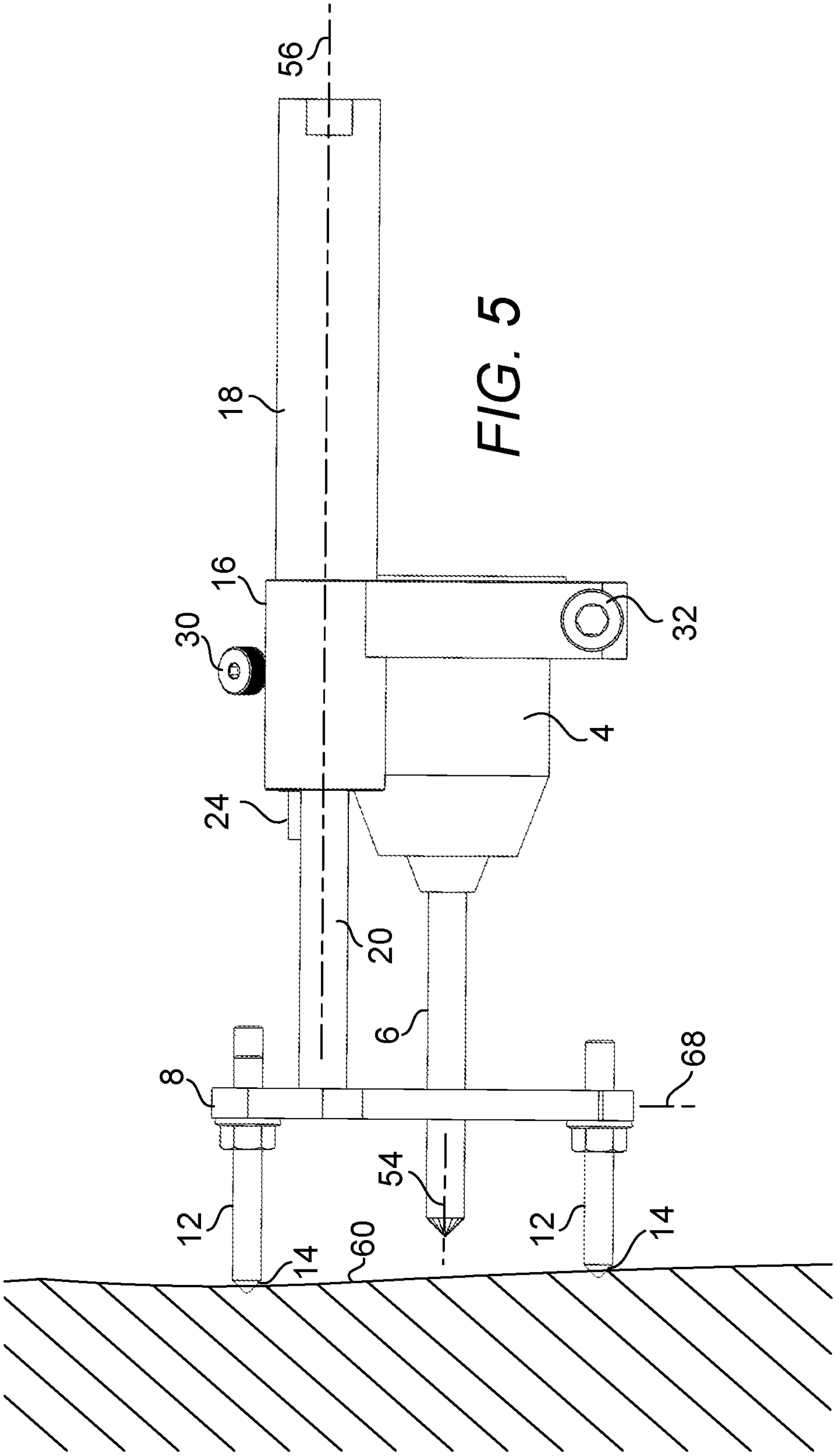
FIG. 5 is a side view of a device configured to be adaptable to a drill, depicting a front plate of the device being disposed in a second position.
Figure 6:
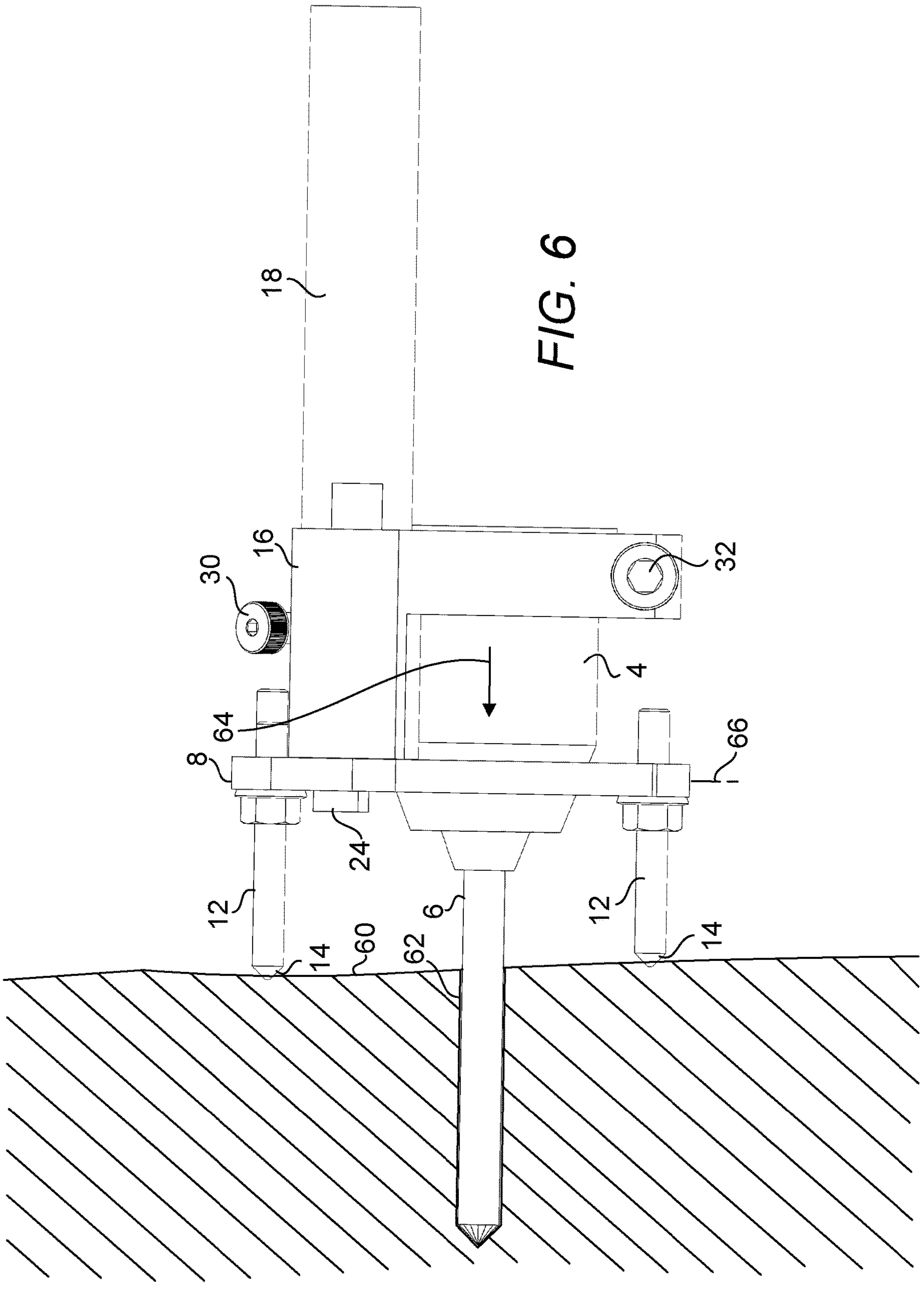
FIG. 6 is a side view of a device configured to be adaptable to a drill, depicting a front plate of the device being disposed in a first position.

FIG. 1 is a top front perspective view of a device 2 configured to be adaptable to a drill 4. FIG. 2 is a top rear perspective view of a device 2 configured to be adaptable to a drill 4. FIG. 3 is a top view of a device 2 configured to be adaptable to a drill 4. FIG. 4 is a front view of a device 2 configured to be adaptable to a drill 4. It shall be noted that, in these and the ensuing drawings, only a portion of a drill is shown. The device 2 is configured to be adapted to a drill 4. The drill 4 has a drill bit 6 and the drill bit 6 has a central axis 54. The device 2 includes an adjustable ring 16, a front plate 8, a plurality of pins 12 and at least one slide 18, e.g., as shown herein. The adjustable ring 16 is configured to be adapted to the drill 4 where the adjustable ring 16 is disposed at a proximal end of the device 2. In use, the adjustable ring 16 is slid over a stationary area of a suitable drill 4 just behind the chuck and secured to this area of the drill 4. A suitable drill is one which is hand-held and electrically-powered either with an electrical cord or with a portable battery. In the embodiment shown, the adjustable ring 16 is a split ring including an opening 58 sized sufficient to be slid over this area where the diameter of the opening 58 is configured to be adjustable by using a fastener 32, e.g., a screw, etc., which secures the two parts of the split ring 16 and can be tightened around the area, securing the ring 16 to the drill 4. The front plate 8 is disposed at a distal end of the device 2 and includes an aperture 10 through which the drill 4 is accommodated. The plurality of pins 12 are disposed on the front plate 8, each pin 12 including a tip 14, e.g., a pointed tip to provide grip while the pins 12 are engaging a tree trunk surface, e.g., tree bark. In the embodiment shown, each pin 12 is configured to be adjustable with respect to the front plate by using a screw and nut combination. Screw threads are disposed on each pin and matching threads are tapped in holes configured for receiving these pins in the front plate 8. Upon adjustment, each pin is secured in place by means of a nut. In this embodiment, two slides 18 are used, each having a central axis 56, although one slide may be sufficient. The use of more than one slide increases the ability of the device to resist the torque created while drilling, ultimately resulting in more precise holes that are drilled. A precise hole is defined as a dimensionally-predictable hole in which a spout fits well to allow sap collection without fail. The front plate 8 is configured to be retractable to a first position 66 as shown in FIG. 6 and extendable to a second position 68 as shown in FIG. 5. The adjustable ring 16 is attached to each slide 18 at a first portion of the slide 18 and the front plate 8 is attached to the slide 18 at a second portion of the slide and a distance between the tip of each pin 12 and the adjustable ring is configured to be adjustable by the slides 18 along the central axis 56 of the at least one slide 18. A slide can be a spring-loaded slide. In the embodiment shown, each slide is essentially a rod 20 configured to travel relative to a cylindrical housing. Within the cylinder, a head end of the rod 20 is disposed in a manner to contact one end of a mechanical spring. The travel of the rod relative to the cylinder is facilitated by a linear motion bearing 22 which also serves as a seal to prevent debris from getting into the cylinder, thereby promoting the longevity of the slide. Alternatively, a slide may include an air spring instead. An appropriate spring rate is selected to require an appropriate level of engagement force to be applied to the slide before the slide can be compressed. Care must be taken to allow a user to sense that the pins 12 have come in contact with a tree trunk and that the device 2 has properly engage it before the user continues to move the device towards the tree in direction 64 to compress the slides 18 to allow the drill to reach the tree trunk such that an elongated cylindrically-shaped hole 62 can be created before a spout can be subsequently inserted. Care must also be taken to ensure that the amount of force needed to compress the springs is sufficiently low for an average user.

The device further includes a lock configured for locking the slides 18 to substantially a first position. In this position, functions rendered by the device 2 for maple tree tapping is suppressed, allowing the drill to be used for purposes originally intended for the drill, e.g., for a broken spout or tap to be drilled out and removed. As such, while the device is attached to a drill, the drill can still be used for other purposes by simply disposing the device in the locked or first position or with the front plate out of the way of the drill bit. In the embodiment shown throughout the figures, it shall be noted that the lock is essentially a barrel rotatably housed in the body 16 where the barrel is capable of rotation about a central axis 52. A trigger 30 is attached to the barrel and disposed at a location of the device such that the barrel is operable by a user while holding the drill by rotating the barrel to an orientation where a block 24 disposed at one end of the barrel is disposed at an orientation with a latch 26 of the block 24 either engaging or disengaging a portion 72 of the front plate 8. A slot 28 made in the body 16 allows the trigger 30 to protrude from the body 16 such that it is accessible to the user. If the latch 26 is engaged with portion 72, the front plate 8 is locked in the first position. The front plate 8 can be released to resume its second position simply by removing this engagement.

FIG. 5 is a side view of a device configured to be adaptable to a drill, depicting a front plate 8 of the device being disposed in a second position 68 relative to the body 16. FIG. 6 is a side view of a device configured to be adaptable to a drill, depicting a front plate 8 of the device being disposed in a first position 66 relative to the body 16. In the position shown in FIG. 5, the device is ready to be used to drill an elongated hole in a maple tree having a surface 60. The device is positioned at a desired surface 60 through which an elongated hole is to be drilled with at least three of the tips 14 engaging the surface 60. Referring back to FIG. 3, it shall be noted that five pins are provided. The area encompassed by the engaging pins 12 are preferably as wide as possible for increased stability of the engagement. In other words, care should be taken to ensure that the pins 12 disposed on the periphery of the area should be adjusted to lengths sufficient to allow their engagements with the surface 60. The pins 12 disposed within the area of engagement delineated by the peripheral pins 12 are preferably adjusted to shorter lengths from the front plate 8 as shown in FIG. 3 to allow them to conform to a contour 76 of a tree trunk. Upon seating the pins 12 against a tree trunk as shown in FIG. 5, a user of the drill 4 can proceed to push the device towards the surface upon which an elongated hole is to be made as shown in FIG. 6. It shall be noted that as the slides 18 and the drill bit 6 are not coaxially disposed as evidenced in the central axis 54 of the drill that is not being coaxially disposed with any one of the central axes 56 of the slides 18, the device assumes an open structure with the bottom space of the drill largely uninhibited, eliminating any opportunity for the device to collect debris as in the case of a device with a cage-like structure.

Figure 7:
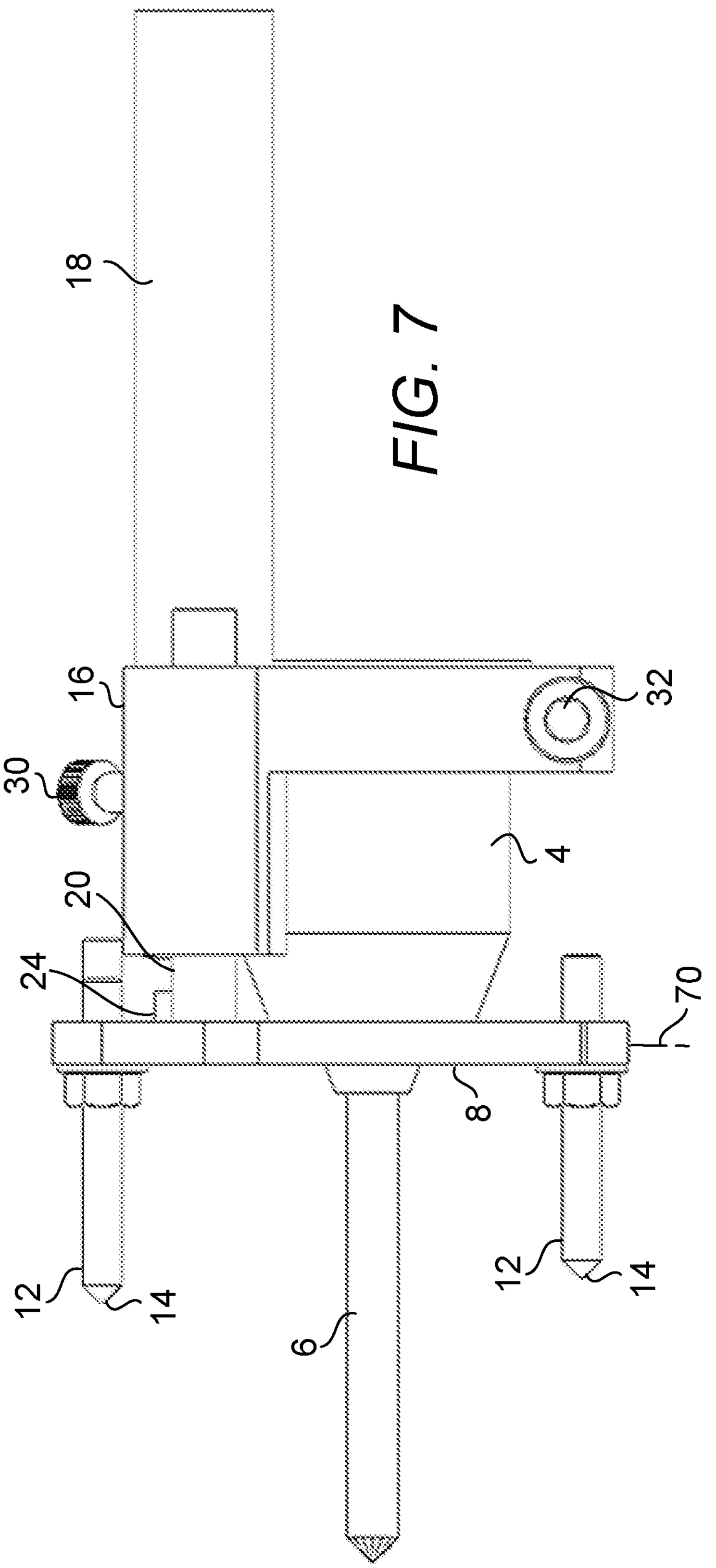
FIG. 7 is a side view of a device configured to be adaptable to a drill, depicting a front plate of the device being disposed in a third position.

FIG. 7 is a side view of a device configured to be adaptable to a drill, depicting a front plate 8 of the device being disposed in a third position 70 relative to the body 16. It shall be noted that the block 24 shown in FIG. 4 as being disposed in an opening 74 of the front plate 8 is now disposed at an orientation preventing the block 24 from being disposed in the opening 74, thereby creating an offset compared to the first position where the block 24 is disposed at least partially in the opening 74 to latch on to portion 72 of the front plate 8. It shall be noted that, in the embodiment shown throughout, the lock serves dual purposes, both as a lock and as a block to limit the retraction of the front plate 8 to a position that is different from first position, thereby providing an alternative position or drilling depth to the device.

Figure 8:
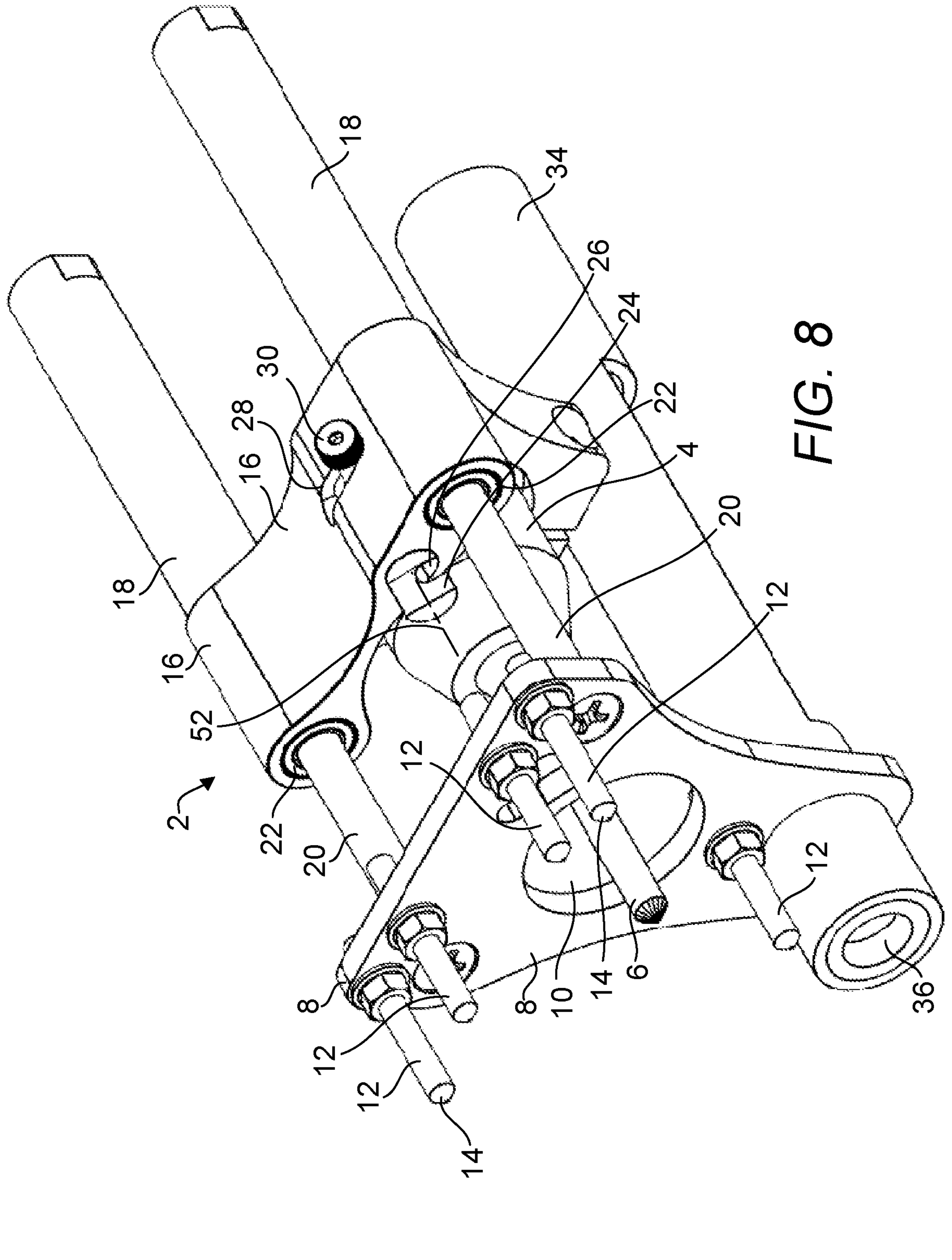
FIG. 8 is a top front perspective view of a device configured to be adaptable to a drill, depicting an additional tool useful for marking a tree at or around the same time the tree is drilled.

In some applications, maple trees are marked once they have been tapped to avoid tapping the same trees more than once in a maple-tapping season. Conventionally, the tapped maple trees are marked with some form of marker, e.g., paint in a process separate from the tapping activity. FIG. 8 is a top front perspective view of a device configured to be adaptable to a drill, depicting an additional tool useful for marking a tree at or around the same time the tree is drilled. Here, the device further includes a paint marker 34 configured to mark a portion of the surface at a moment a drill is pushed against the surface to be drilled. As the device is pushed against a surface to be drilled, a paint marker tip 36 of the paint marker 34 approaches the surface and eventually making contact with the surface to mark the surface with some paint. In this embodiment, as the device includes both a tapping tool and a marker, the process of tapping each tree using this device includes drilling and marking of the tree simultaneously, eliminating the need to mark the tree separately.

Figure 13:
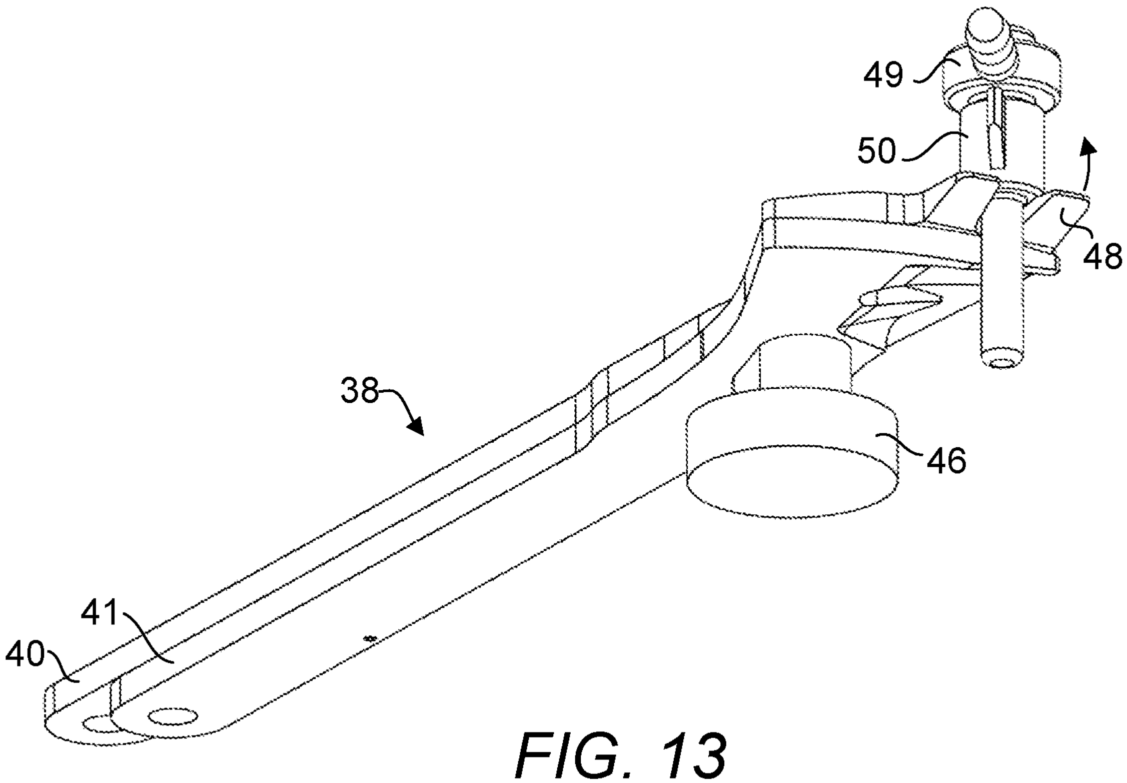
FIG. 13 is a bottom front perspective view of the device of FIG. 9 disposed in a manner useful as a claw.

Sap is typically collected using a vacuum hose system consisting of spouts inserted in bored holes in maple trees, and the hoses connected to the spouts are led to a central sap collection tank. Sap contamination is an on-going problem to be avoided, as are leaks. Spouts can be one piece or two pieces. In both configurations, one end of the spout is tapered with annular ribs that is driven in a bored hole in the tree. At the beginning of each tapping season, the part of the spout that was inserted into a tree is replaced to ensure proper sanitation of the tap hole. A used spout can put contaminants in the tree that greatly affect sap production. To remove a one-piece spout from a tree, the attached hose, connected to the spout with a tapered ribbed coupler end, will need to be cut since removal of the hose from the ribbed end is very difficult. This shortens the hose each season, and eventually requires the hose to be replaced when its length is too short to connect to the rest of the system. This increases operating and material costs. A better approach is now thought to use a two-part spout as shown in FIG. 13 where the spout includes a check valve adapter 50 with a tapered tap 92 that is inserted into a bored tree hole, and a mating stubby spout 49 with taper 94 that fits snuggly into a matching tapered hole in the end of the check valve adapter. The check valve prevents sap from getting drawn back into the tree, causing the tap hole to prematurely close up and reduce sap flow near the end of the season. At the end of the season the stubby spout with attached hose is removable from the check valve adapter, and the check valve adapter can be plugged and left in the tree or removed using the claw 48. Plugging the check valve adapter keeps wasps from building a mud nest in the open end. Removing the check valve adapter from the tree can be difficult and often results in breakage. After removal, the tree may begin to heal and close the hole requiring a new hole to be drilled at the start of the new season. This can threaten the health of the tree if too many holes are subsequently drilled in the same area of the tree.

It has been found, however, that sap production is greatly increased by boring a new hole and inserting a new check valve adapter at the start of the new season. The stubby spout with attached hose can be separated from the check valve adapter using the tool 38 at the end of the season, and cleaned and stored away for the next season. No portion of the hose or stubby spout is wasted, keeping operating and material costs to a minimum.

Figure 9:
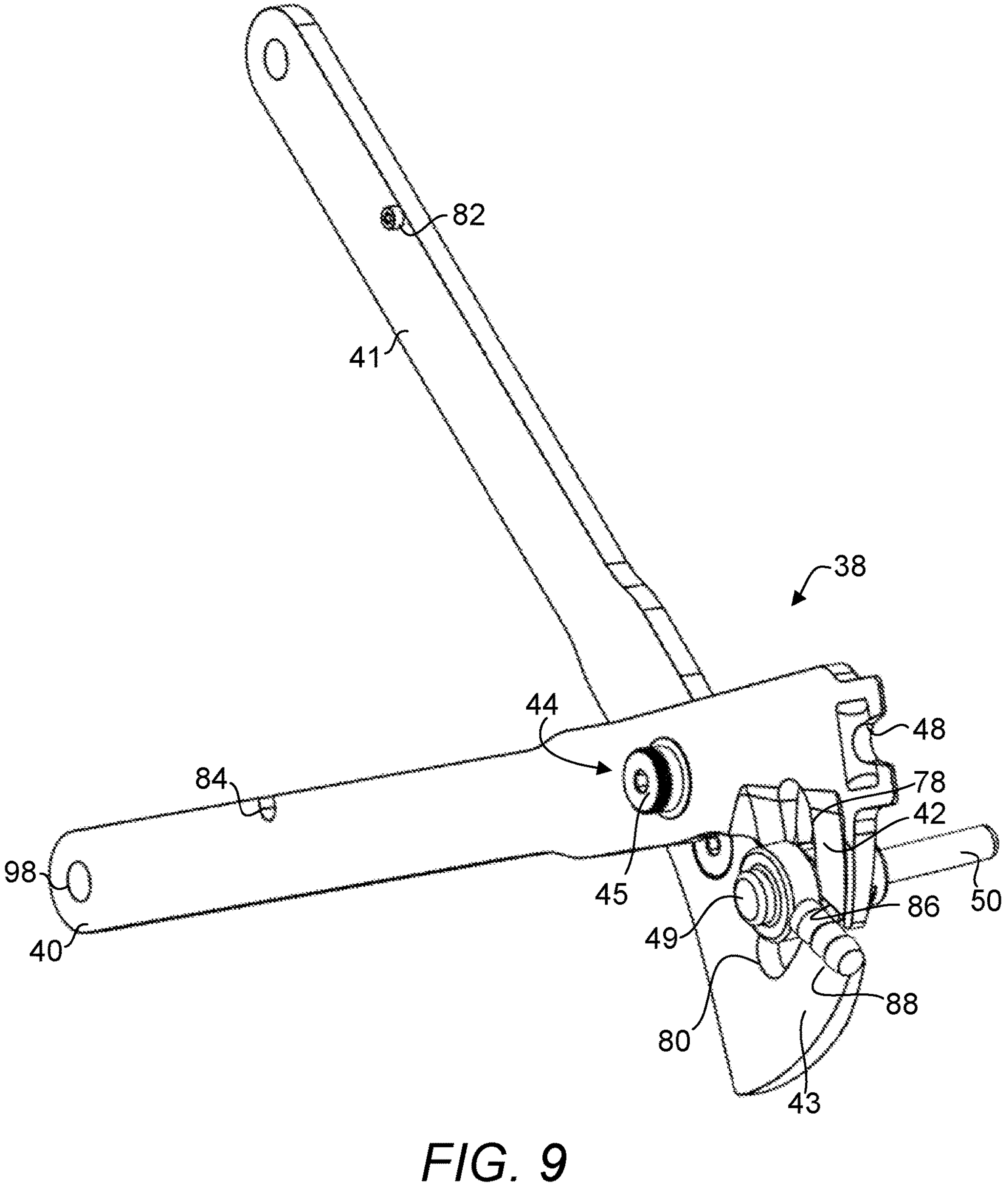
FIG. 9 is a top front perspective view of a second device useful for maintenance related to the tapping of a maple tree, depicting the second device being disposed in a position to separate a spout in preparation for its replacement with a new spout.
Figure 10:
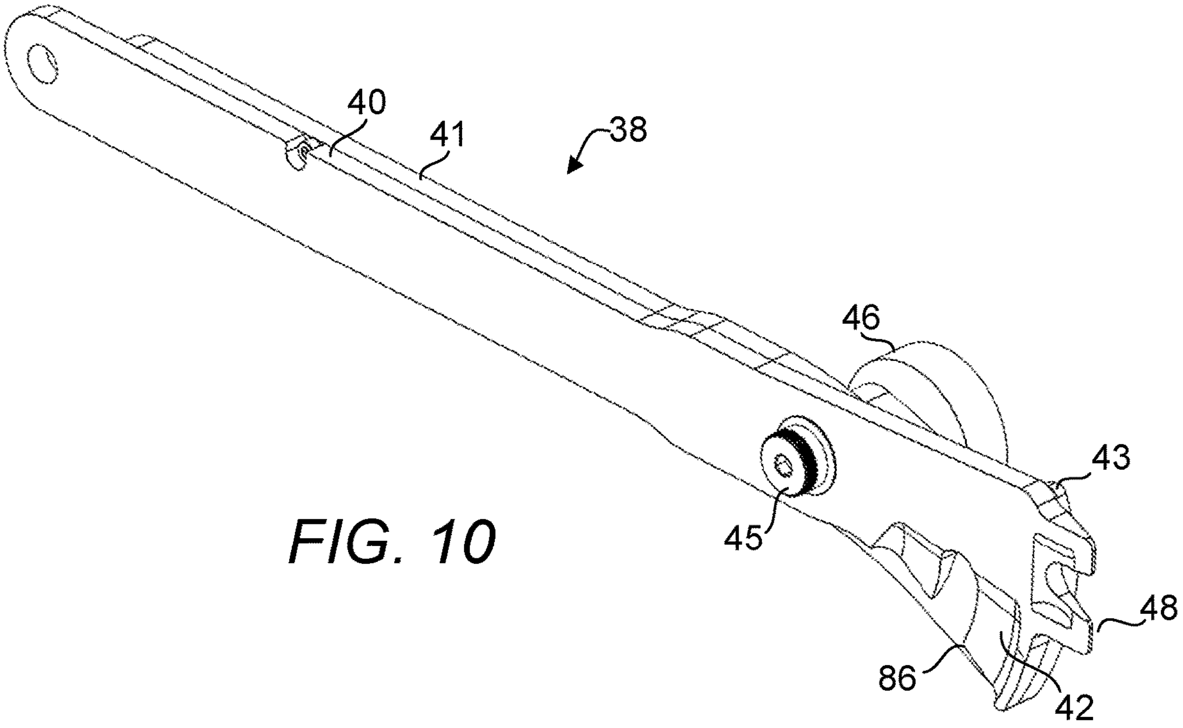
FIG. 10 is a top front perspective view of the device of FIG. 9 disposed in a manner such that it is useful as a hammer or a claw.
Figure 11:
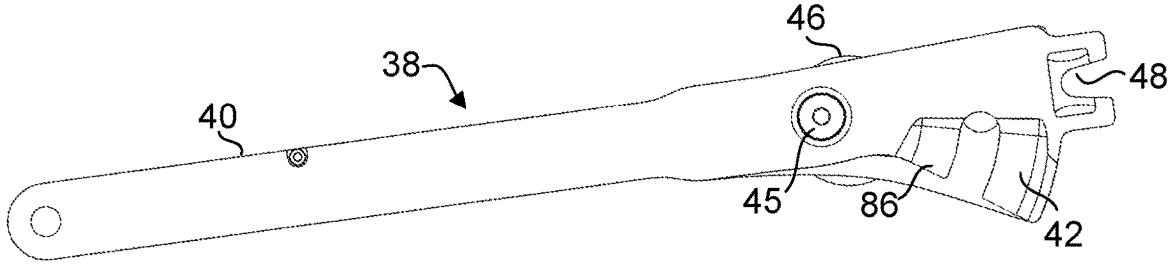
FIG. 11 is a side perspective view of the device of FIG. 9 disposed in a manner such that it is useful as a hammer or a claw.
Figure 12:
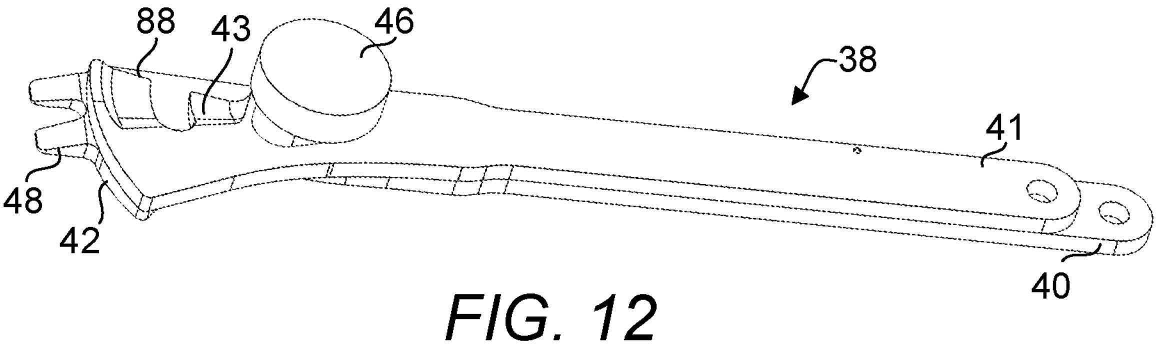
FIG. 12 is a bottom perspective view of the device of FIG. 9 disposed in a manner such that it is useful as a hammer or a claw.
Figure 14:
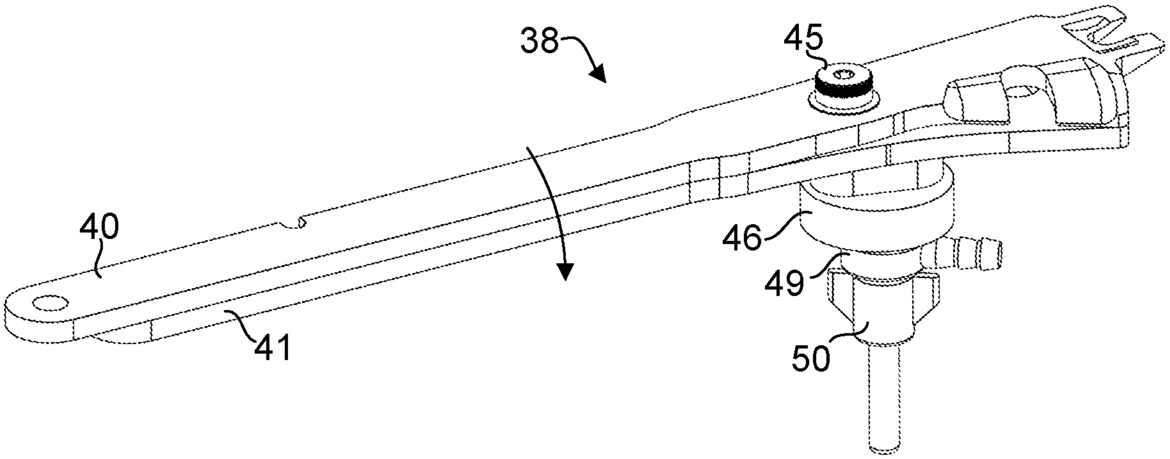
FIG. 14 is a top side perspective view of the device of FIG. 9 disposed in a manner useful as a hammer.
Figure 15:
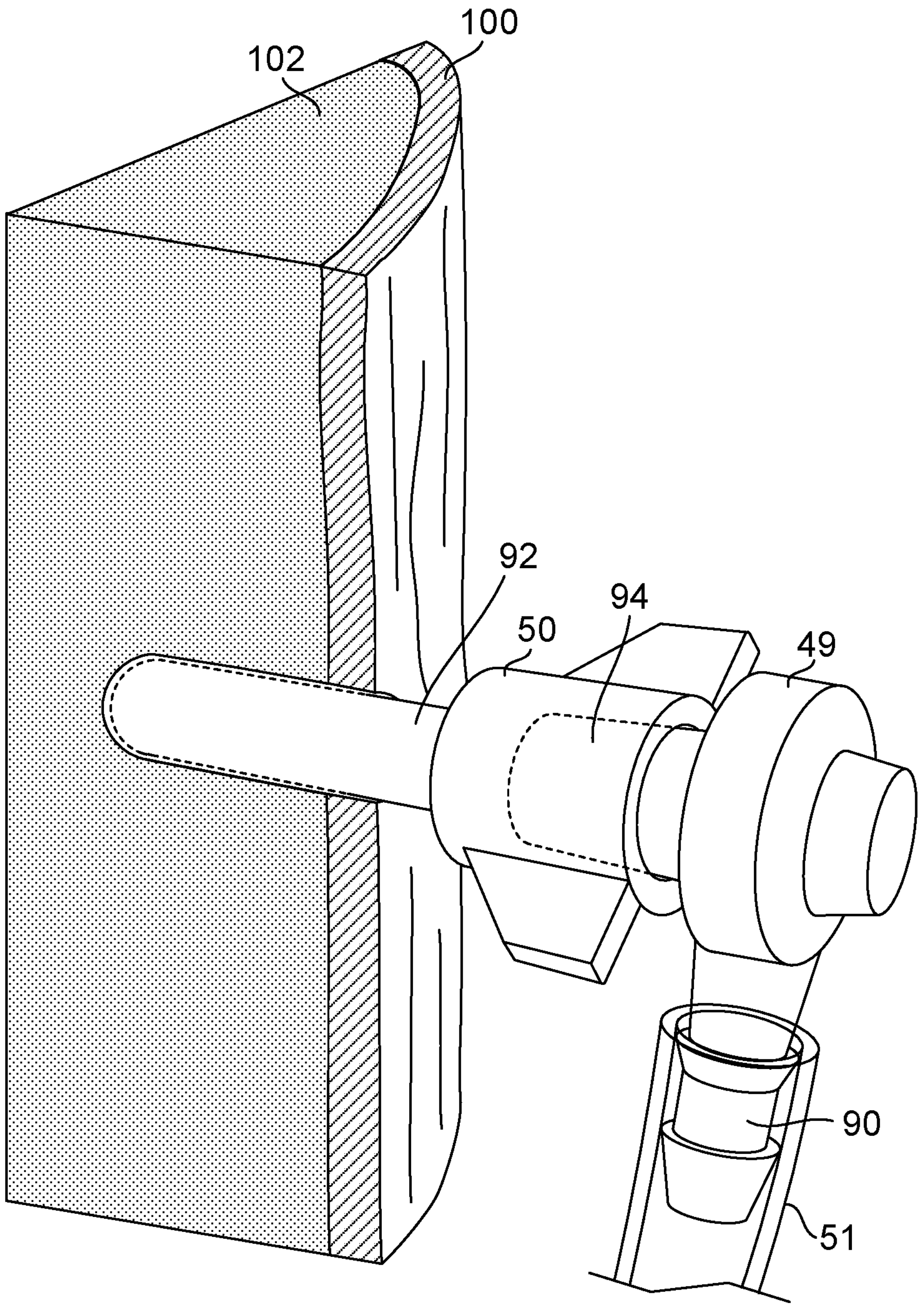
FIG. 15 is a diagram depicting a manner in which a spout is used to communicate tree sap to a hose.

Upon setting up a tap for a maple tree, maintenance of the tap is required at a later time. At the beginning of each tapping season, the part of a spout that was inserted into a tree is replaced to ensure proper sanitation of the tap hole. A used spout can put contaminants in the tree that greatly affect sap production. In solving this problem, a combination of a spout adapter, e.g., a check valve adapter, and a stubby spout is used. A spout adapter is the part inserted into a tree and the stubby spout is connected at one end to a line that leads to a collection system and the other end to the spout adapter. It is challenging to separate the two parts, causing many maple syrup producers to avoid the two-part system. Disclosed herein is a second device 38 useful for separating spout parts, e.g., used, non-functioning or non-productive spout parts to make the two-part system more user friendly, e.g., easier to be separated and therefore more readily accepted with its user. The device 38 is useful for easily separating the two parts of this spout system by wedging them apart. The device 38 is also configured to be useful for replacing the spout before tapping, in which a hammer would be optimal to pair with the separator as one would first separate an old spout adapter from the stubby spout and then replace it with a new one, using the same tool to then tap it into a new hole drilled in a tree. With the two-part spout, the stubby spout can be reused, thereby removing the need to reconnect a hose to a new spout and to save a still useful part from being discarded. This device is also suitable for use to separate the two parts and to remove an old adapter at the end of a tapping season by pulling the spout out of the tree into which the spout has been inserted. In this case, a claw of the device is used to pry out the old spout before or after the two parts have been separated. FIG. 9 is a top front perspective view of a device useful for maintenance related to the tapping of a maple tree, depicting the device being disposed in a position to separate parts of a spout in preparation for its replacement with a new spout. FIG. 10 is a top front perspective view of the device of FIG. 9 disposed in a manner such that it is useful as a hammer or a claw 48, e.g., a beveled claw. FIG. 11 is a side perspective view of the device of FIG. 9 disposed in a manner such that it is useful as a hammer or a claw 48. FIG. 12 is a bottom perspective view of the device of FIG. 9 disposed in a manner such that it is useful as a hammer or a claw 48. The device is essentially a device which combines a spreader, a hammer and a claw in a single unit useful for removing and/or replacing at least a part of a spout. To facilitate the replacement of the part, the spout may not need to be removed in its entirety. The device includes a pair of plates, e.g., jaws 42, 43 which extend into shanks 40, 41 pivotably secured at a pivot point 44. In one embodiment not shown, the jaws 42, 43 may also be actuated using a mechanism according to principles of a parallel jaw mechanism where the jaws are disposed in parallel while they are being actuated. For separating a spout, the shanks 40, 41 are spread sufficiently far apart so that the jaws 42 and 43 can surround the tip of the spout at attachment interface 96 before the shanks 40, 41 are closed such that jaws 42 and 43 slide against each other to progressively exert a spreading force by contacting a portion of the stubby spout 49 and a portion of the adapter 50. A claw 48, useful for prying the portion of the spout left in a tap as shown in FIG. 13, is configured to extend from one of the jaws, e.g., jaw 42. The claw 48 may alternatively be configured to extend from jaw 43. A striking head 46 or striker is configured to be attached to one of the jaws as shown in FIG. 14, e.g., jaw 43, again providing an additional function to the device. The second shank 41 is configured to be stacked or overlapped with respect to the first shank 40 when the first jaw and the second jaw are disposed in the closed position as shown in FIGS. 10-12. It shall be noted that, the first jaw 42 includes a first thickness at the leading edge 86 of the first jaw 42 that is less prominent than a second thickness at a portion of the first jaw 42 away from the leading edge 86 of the first jaw 42. The second jaw 43 includes a similar cross-sectional profile albeit the cross-sectional profile is disposed in an opposite orientation to the cross-sectional profile of the first jaw 42. For instance, the second jaw 43 includes a first thickness at the leading edge 88 of the second jaw 43 that is less prominent than a second thickness at a portion of the second jaw 43 away from the leading edge 88 of the second jaw 43. It shall be noted that as the jaws 42, 43 are closed against one another, the contact points of the attached unit on the jaws 42, 43 become father apart, eventually resulting in insufficient friction between the two parts for the two parts to be held together. Although the change in thickness of a cross-sectional profile of a jaw 42, 43 can create this effect, a jaw having a consistent thickness can achieve a similar effect if it is orientated to mimic a taper of the cross-sectional profile.

The hammer is useful for more securely inserting a new spout or a replacement adapter in a tapped hole. The stacked shanks 40, 41 together serve as a handle for the device to be used as a claw or a hammer. In the embodiment shown, the striking head 46 is configured to be secured to the second shank 41 using a pin 45, e.g., a fastener, screw, etc., configured to pivotably connect the first shank 40 and the second shank 41. By disposing the striking head 46 at the pivot point, the rigidity of the striking head 46 as it is connected to the handle is enhanced.

The device further includes a stop 82, disposed on the second shank 41 to ensure that a handle has been properly formed when the stop 82 comes in contact with a cutout 84 disposed on the first shank 40. Although the stop 82 is shown disposed on the second shank 41, it can alternatively be disposed on the first shank 40 as long as the second shank includes a similar cutout as the one 84 disposed on the first shank 40 to accommodate the stop. Although not a requirement, the first jaw 42 and the second jaw 43 each includes a cutout 78, 80 disposed at the respective leading edge 86, 88 to surround the attachment interface 96 such that the jaws 42, 43 can act on the attachment interface 96 more securely. Further, with the cutouts, the taper in a jaw or plate does not need to be so severe as the cutout allows sufficient travel of the jaw with respect to a width of the attachment interface 96. The device 38 further includes a hanging hole 98 disposed at least on one of the first shank 40 and the second shank 41. In the embodiment shown, the first shank 40 is disposed in an extension exceeding that of the second shank 41, exposing the hanging hole 98 to facilitate the storage of the device by using a hook or to allow the device to be secured at the hanging hole 98 with a lanyard while allowing the device to be operable.

Figure 16:
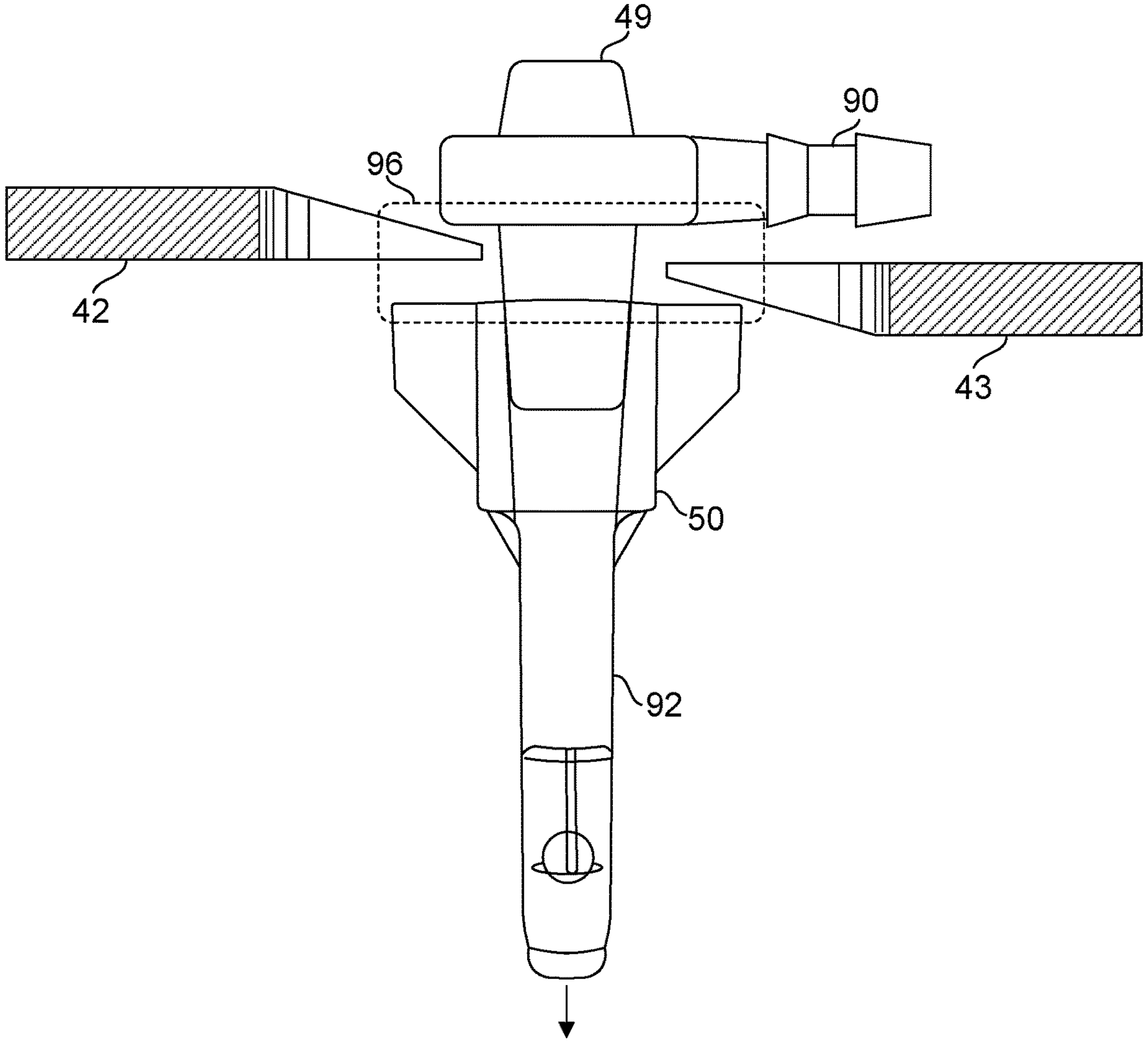
FIG. 16 is a diagram depicting the jaws of the device of FIG. 9 surrounding the attachment interface of an attached unit formed of a stubby spout and a check valve adapter.
Figure 17:
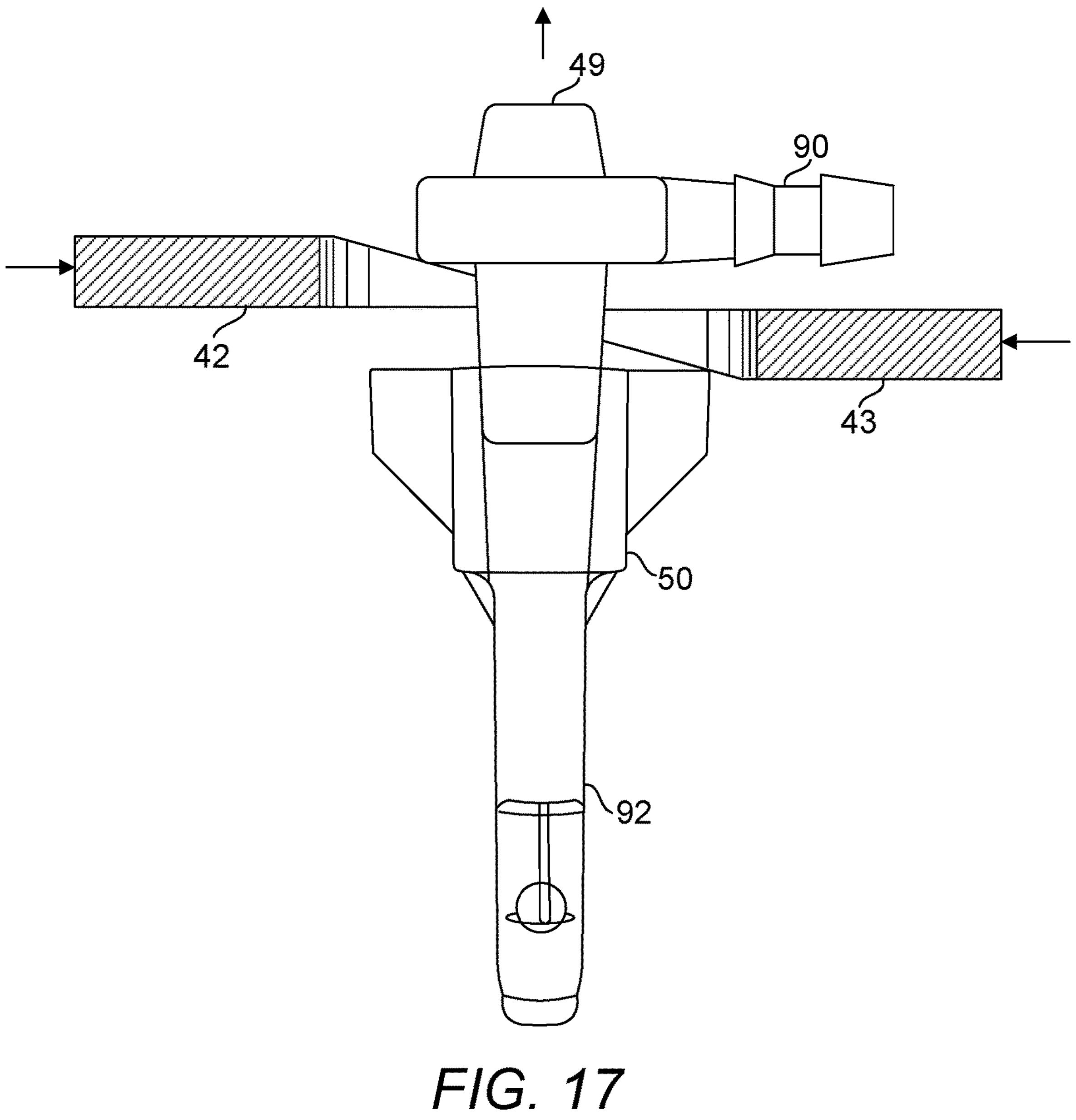
FIG. 17 is a diagram depicting the jaws of the device of FIG. 9 as shown in FIG. 14 when the jaws of the device continue to be closed to engage the attached unit before separating the attached unit into two parts as shown elsewhere herein.
Figure 18:
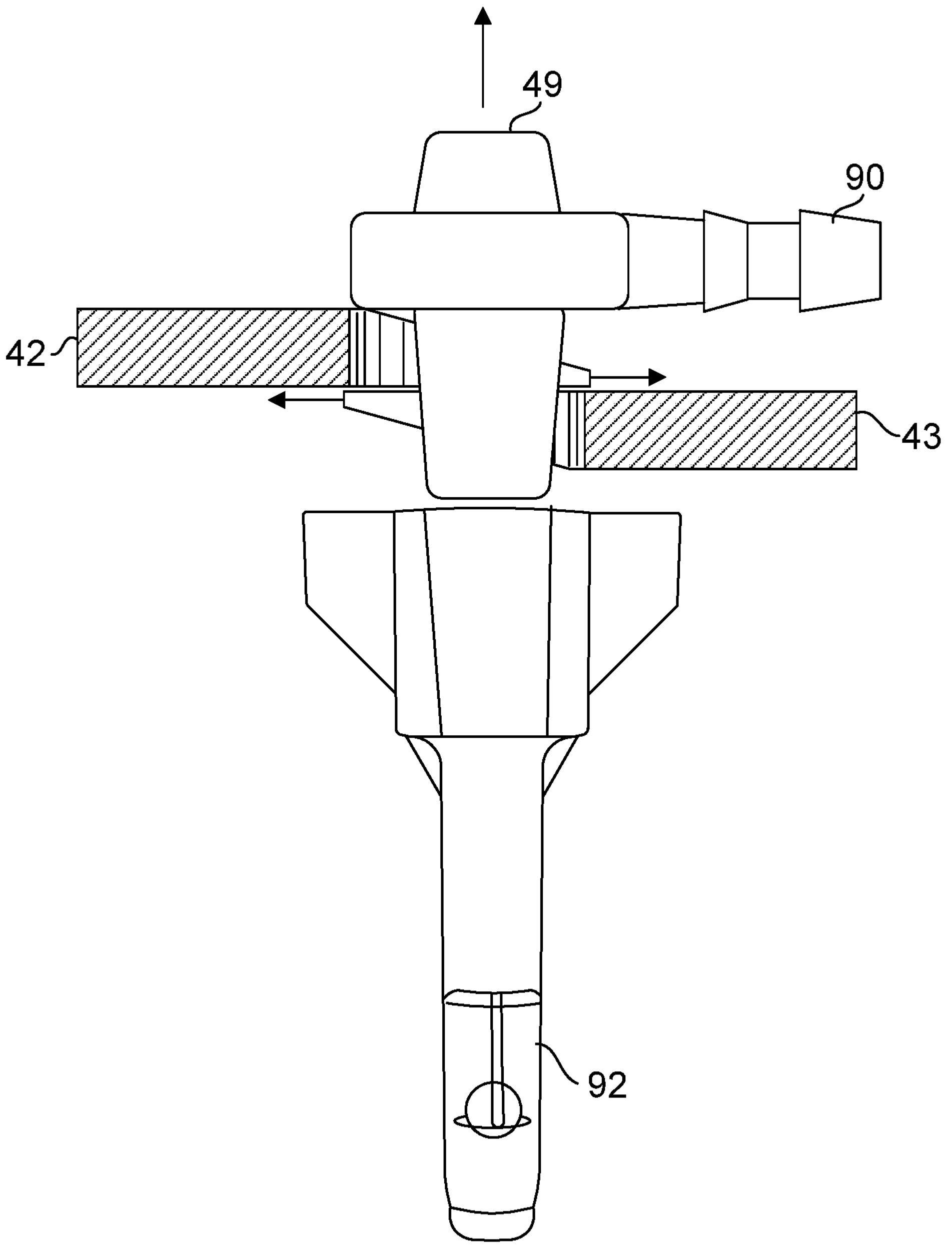
FIG. 18 is a diagram depicting the jaws of the device of FIG. 9 upon having separated a stubby spout from a check valve adapter of an attached unit.

FIGS. 16, 17, and 18 depict a progression of separating a stubby spout from a check valve adapter using the tool of FIG. 9. FIG. 16 is a diagram depicting the jaws of the device of FIG. 9 surrounding the attachment interface 96 of an attached unit formed of a stubby spout 49 and a check valve adapter 50. FIG. 17 is a diagram depicting the jaws 42, 43 of the device of FIG. 9 as shown in FIG. 16 when the jaws 42, 43 of the device continue to be closed to engage the attached unit before separating the attached unit into two parts as shown elsewhere herein. FIG. 18 is a diagram depicting the jaws 42, 43 of the device of FIG. 9 upon having separated a stubby spout 49 from a check valve adapter 50 of an attached unit.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A device for separating two parts, a first of the two parts is configured to be inserted in a second of the two parts in a first direction to form an attached unit, said device comprising:

(a) a first plate comprising a leading edge; and (b) a second plate comprising a leading edge, wherein said first plate is configured to cooperate with said second plate to separate the attached unit, said first plate and said second plate are configured to be oppositely disposed about the attached unit with their leading edges facing one another and said first plate and said second plate being pivotably connected to one another about a pivot axis and movable between an open position and a closed position, wherein relative movement of at least one of said first plate and said second plate toward the other is effected by pivotal movement about the pivot axis, without either said first plate or said second plate being supported for movement in a direction orthogonal to said pivotal movement, such that a distance in the first direction between a first contact point between said first plate and the attached unit and a second contact point between said second plate and the attached unit increases to cause the attached unit to be separated into the two parts.

2. The device of claim 1, wherein a first part of the two parts is a stubby spout and a second part of the two parts is a check valve adapter.

3. The device of claim 1, wherein said first plate comprises a first thickness at said leading edge of said first plate and a second thickness at a portion of said first plate away from said leading edge of said first plate and said second thickness is greater than said first thickness.

4. The device of claim 1, wherein at least one of said first plate and said second plate comprises a cutout disposed at said respective leading edge, said cutout configured to surround a portion the attached unit.

5. The device of claim 1, further comprising a striking head.

6. The device of claim 5, wherein said striking head is configured to be secured to one of said first plate and said second plate using a pin.

7. The device of claim 5, wherein said first plate is configured to be disposed in an overlapped configuration with respect to said second plate to form a handle for said striking head.

8. The device of claim 7, further comprising a stop disposed on one of said first plate and said second plate to ensure that said handle has been properly formed when said stop comes in contact with the other plate of said first plate and said second plate.

9. The device of claim 1, further comprising a beveled claw extending from one of said first plate and said second plate.

10. The device of claim 1, further comprising a hanging hole disposed on one of said first plate and said second plate.

11. A device for separating two parts, a first of the two parts is configured to be inserted in a second of the two parts in a first direction to form an attached unit, said device comprising:

(a) a first jaw comprising an inner surface, an outer surface, a leading edge and a cross-sectional profile which tapers from the outer surface of said first jaw towards said leading edge of said first jaw, wherein said first jaw comprises a maximum thickness between the inner surface and the outer surface of said first jaw;

(b) a second jaw comprising an inner surface, an outer surface, a leading edge and a cross-sectional profile which tapers from the outer surface of said second jaw towards said leading edge of said second jaw, wherein said second jaw coupled to and movable relative to said first jaw between a closed position and an open position with said inner surface of said first jaw and said inner surface of said second jaw facing one another, said second jaw is configured to define a space with respect to said first jaw to receive an attachment interface of the attached unit in a position between said closed position and said open position and said second jaw comprises a maximum thickness between the inner surface and the outer surface of said second jaw, wherein a relative movement of said second jaw toward said first jaw is effected by pivotal movement about a pivot axis, without either said first jaw or said second jaw being supported for movement in a direction orthogonal to said pivotal movement, and wherein the relative movement applies a spreading force exerted in a second direction opposite the first direction corresponding to a combined effective thickness of said first jaw and said second jaw of up to the sum of the maximum thickness of said first jaw and the maximum thickness of said second jaw, thereby separating the attached unit into the two parts when said first jaw and second jaw are disposed about the attachment interface.

12. The device of claim 11, further comprising a first shank extending from said first jaw and a second shank extending from said second jaw, wherein said second shank is configured to be stacked with respect to said first shank when said first jaw and said second jaw are disposed in said closed position.

13. The device of claim 11, further comprising a first shank extending from said first jaw and a second shank extending from said second jaw.

14. The device of claim 11, wherein at least one of said first jaw and said second jaw comprises a cutout disposed at said respective leading edge, said cutout is configured to surround the attachment interface.

15. The device of claim 11, further comprising a striking head, a first shank extending from said first jaw and a second shank extending from said second jaw, wherein said striking head is configured to be secured to one of said first shank and said second shank using a pin.

16. The device of claim 11, further comprising a stop, a first shank extending from said first jaw and a second shank extending from said second jaw, wherein said stop is disposed on one of said first shank and said second shank to ensure that a handle has been properly formed when said stop comes in contact with the other one of said first shank and said second shank.

17. The device of claim 11, further comprising a beveled claw extending from one of said first jaw and said second jaw.

18. The device of claim 11, further comprising a hanging hole, a first shank extending from said first jaw and a second shank extending from said second jaw, wherein said hanging hole is disposed on one of said first shank and said second shank.

19. The device of claim 11, wherein a first part of the two parts is a stubby spout and a second part of the two parts is a check valve adapter.

* * * * *